United States Patent Office 3,776,974
Patented Dec. 4, 1973

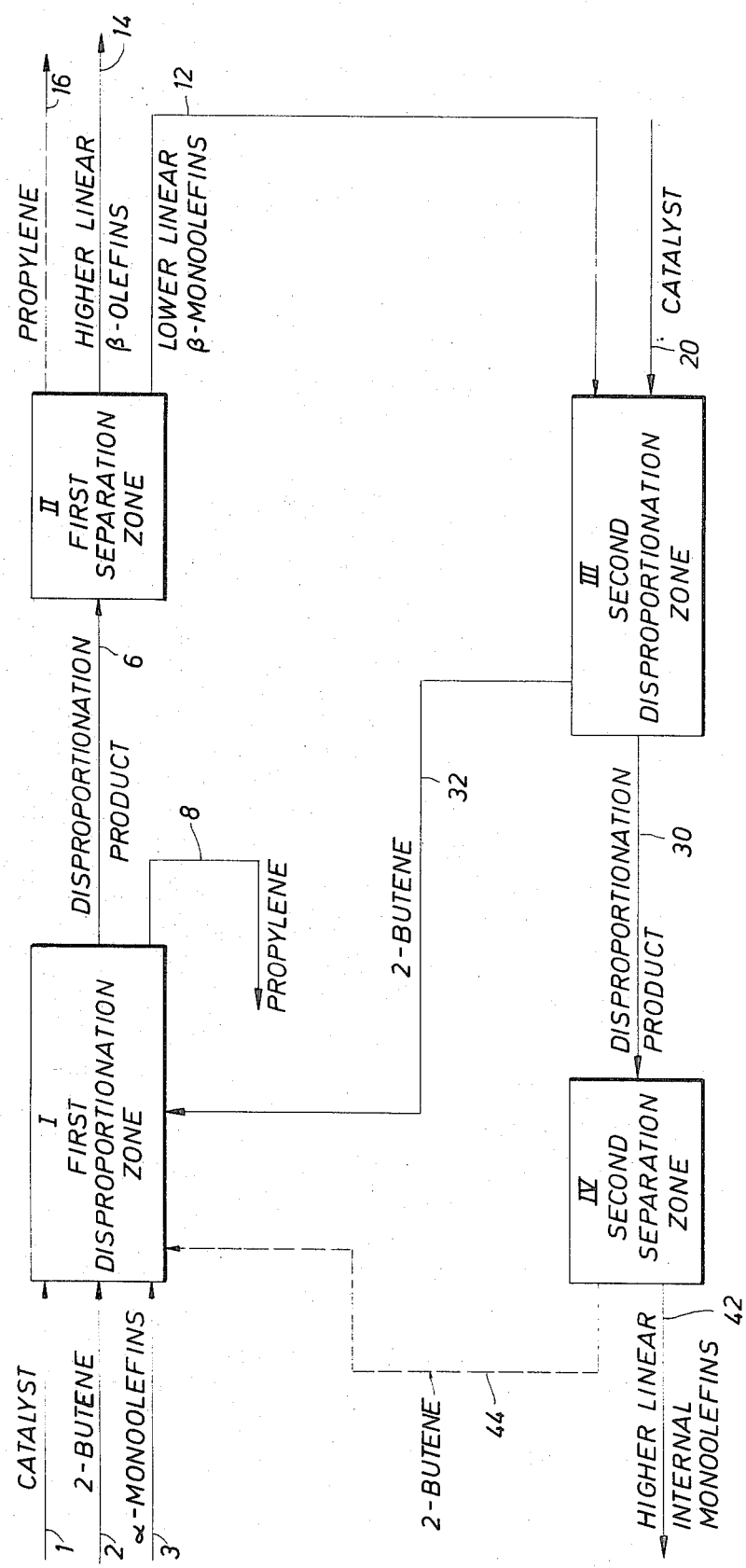

3,776,974
LINEAR MONOOLEFIN PRODUCTION
Pieter A. Gautier, Deer Park, Tex., and Franciscus J. F. van der Plas and Pieter A. Verbrugge, Amsterdam, Netherlands, assignors to Shell Oil Company, Houston, Tex.
Filed Feb. 17, 1972, Ser. No. 227,193
Claims priority, application Great Britain, Feb. 22, 1971, 5,107/71
Int. Cl. C07c 3/62
U.S. Cl. 260—683 D          4 Claims

ABSTRACT OF THE DISCLOSURE

Linear α-olefins, of principally even carbon number, preferably produced by oligomerization of ethylene, are converted to detergent range linear monoolefins of both even and odd carbon number by (1) disproportionating the linear α-olefins with 2-butene (2) separating of the resulting disporportionation product into a lower linear β-olefin fraction below the detergent range of carbon numbers and a higher linear β-olefin fraction within the detergent range of carbon numbers (3) recovering the higher linear β-olefin fraction as product (4) subjecting the lower β-olefin fraction to disproportionation to yield 2-butene and linear internal monoolefins and (5) separating and recovering from the resulting lower β-olefin disproportionation reaction mixture the normal internal monoolefin fraction within the detergent range of carbon numbers.

BACKGROUND OF THE INVENTION

Field of the invention

The present invention relates to the production of linear monoolefins, which are compounds of established utility for a variety of applications. One of the primary applications of linear monoolefins is their use as starting materials for biodegradable synthetic detergents. In this application the linear detergent range monoolefins of 11 to 14 carbon atoms are hydroformylated in the presence of a conventional hydroformylation catalyst to aldehyde with simultaneous reduction of most of the aldehydes to $C_{12}$–$C_{15}$ alcohols. These alcohols are then converted to detergent base materials by esterification with sulfuric acid or by ethoxylation with ethylene oxide in the presence of a base catalyst e.g. sodium hydroxide. Also, in another application, the lower molecular weight alcohols can be esterified with polyhydric acids e.g., phthalic acid to form plasticizers for polyvinyl chloride.

Furthermore, linear monoolefins with 11–14 carbon atoms are treated with carbon monoxide and water or with formic acid, in the presence of liquid, strongly acidic catalysts, such as, for example, sulfuric acid, phosphoric acid or mixtures of phosphoric acid, boron trifluoride and water, for the preparation of monocarboxylic acids, the carboxyl group of which is bound to a tertiary or quaternary carbon atom. The last mentioned acids are turned to a great variety of uses and can for instance be processed to chemical and light-resistant alkyl resins via their glycidyl esters and to latex paints based on copolymers of their vinyl esters and vinyl acetate.

Description of the prior art

Several methods are known in the art of production of linear monoolefins. In a commercially applied process, n-alkenes of both odd and even carbon numbers suitable for the synthesis of detergents and branched carboxylic acids are manufactured by thermal cracking of wax. This way of meeting the need of n-alkenes may present two problems. The first problem arises as a result of the possibility that wax, being a by-product, may not always become available in sufficient quantities. The second problem may arise from the fact that diolefins may be present in olefins formed by wax cracking. These diolefins are often undesirable; in the preparation of detergents, for instance, they give rise to the formation of compounds which may unfavorably influence the quality of the ultimate detergents.

Another method of production of linear monoolefins which avoids the formation of diolefins is oligomerization of ethylene. This method has a very attractive feature in that ethylene may be produced starting from a variety of raw materials and using a number of different processes. Unlike wax, these raw materials are usually not by-products. For example, ethylene may be produced from naphtha and gas oil fractions by cracking them in the presence of steam. Using this method ethylene is oligomerized to higher molecular weight linear monoolefins in the presence of certain organometallic catalysts e.g. Ziegler-type catalysts such as aluminum trialkyls. Although such catalytic ethylene oligomerization processes have been known for many years they have not been widely utilized in commerce. One major reason for this lack of commercial utility is the difficulty of directing the catalytic oligomerization to produce a product fraction of controlled and specific molecular weight range. Typically, the oligomerization products of ethylene follow a geometric distribution pattern, i.e., wherein each oligomer of n-carbon atoms is present at some constant molar ratio greater than the next higher oligomer of n+2 carbon atoms. Thus, the higher oligomers desired for the production of detergents are produced in smaller molar quantities than the lower oligomers. Another consequence of oligomerization of ethylene is that only olefins having even numbered carbon chains are produced, while in the preparation of detergents, mixtures of even olefins with the odd lying in the same range (for instance n-alkenes with 11, 12, 13 and 14 carbon atoms) provide products with the most desirable detergent properties.

SUMMARY OF THE INVENTION

It has now been found that linear α-monoolefins, principally of even carbon number, are converted to linear monoolefins of both even and odd carbon number within the detergent range of carbon numbers by an improved integrated process which comprises (1) disproportionating linear α-olefins with 2-butene to produce linear β-olefins and propylene in the presence of an olefin disproportionation catalyst (2) separating from the resulting disproportionation product a lower linear β-olefin fraction below the detergent range of carbon numbers and a higher linear β-monoolefin fraction within the detergent range of carbon numbers (3) recovering the higher linear β-olefin fraction as product (4) subjecting the lower β-olefin fraction to disproportionation to yield 2-butene and linear internal monoolefins (5) separating and recovering from the resulting disproportionation reaction mixture the normal internal monoolefin fraction within the detergent range of carbon numbers. In a preferred aspect of the instant invention the 2-butene formed in the second disproportionation reaction, described in step (4) above, may be recovered and recycled to the initial disproportionation reaction described in step (1) above, thus reducing the quantity of 2-butene feedstock required for the process as well as increasing the overall conversion of 2-butene to higher monoolefin product in the process.

With the novel integrated process of the instant invention mixtures of both even and odd numbered linear monoolefins within the detergent range of carbon numbers can be obtained in good yield from starting materials which are widely available in commerce without the formation of diolefin by-products. This process thus avoids or overcomes the several problems which are inherent in the prior art processes applicable to the production of linear monoolefins when linear monoolefins within a selected range of carbon numbers are desired. The advantages of the instant process over the prior art processes are especially apparent when the process is applied to the production of detergent range olefins, e.g. $C_{11}$–$C_{14}$ olefins, used in the preparation of synthetic detergents. Using the process of the instant invention abundantly available lower ethylene oligomers of even carbon number e.g., 6, 8 and 10 carbon atoms, are readily converted into internal and $\beta$-monoolefins of both even and odd carbon number in the detergent range e.g., 11, 12, 13 and 14 carbon atoms, without the formation of the undesirable diolefins. Thus the process of the invention affords a heretofore unavailable ready source of both even and odd monoolefins in the detergent range, the mixtures of which, upon hydroformylation and esterification or ethoxylation, provide detergent products.

DESCRIPTION OF DRAWING

The sole figure of the drawing is a schematic flow diagram of a preferred embodiment of the invention. In the drawing, I designates a first disproportionation zone, II a first separation zone, III a second disproportionation zone and IV a second separation zone. For convenience and clarity, apparatus not essential to a complete understanding of the invention such as means for providing heat, refrigeration, stirring, pressure control, cooling, separations and the like have been omitted from the drawing. The selection and location of such means will be apparent to one skilled in this art.

With reference to the drawing, one modification of the process may be summarized as follows. A disproportionation catalyst is charged through line 1, the 2-butene through line 2 and the linear $\alpha$-monoolefin feedstock through line 3 to the disproportionation zone I, maintained at desired reaction conditions of temperature and pressure. In this preferred embodiment the linear $\alpha$-monoolefin feedstock charged to the disproportionation zone I is made up of a mixture of linear $\alpha$-monoolefins of even carbon number in the $C_6$ to $C_{12}$ range preferably produced by oligomerization of ethylene e.g. ethylene oligomers with 6, 8, 10 and 12 carbon atoms per molecule. By way of illustration this preferred $\alpha$-monoolefin feedstock may be designed as a mixture of monoolefins having $C_n$ carbon atoms, $n$ being an even number in the 6 to 12 range. The resulting disproportionation product mixture comprising a mixture of odd numbered linear $\beta$-olefins having $C_{n+1}$ carbon atoms, e.g., $\beta$-olefins with 7, 9, 11 and 13 carbon atoms per molecule, and propylene is removed through line 6 to the first separation zone II wherein the propene may be flashed off and recovered through line 16 for other applications. Preferably, however the propylene is at least partially removed via line 8 directly from the disproportionation zone I as it is formed by taking advantage of its volatility characteristics. In the separation zone II, such as a fractional distillation zone, the $C_{n+1}$ $\beta$-olefin products are separated into a lower $\beta$-olefin fraction, e.g., $C_7$ and $C_9$, and a higher $\beta$-olefin fraction $C_{11}$ and $C_{13}$ in the detergent range of carbon numbers. The higher olefin fraction is recovered as product through line 14 while the lower olefin fraction is passed through line 12 to the second disproportionation zone III wherein the lower $\beta$-olefin fraction undergoes disproportionation in the presence of a second disproportionation catalyst introduced through line 20 to yield even numbered linear internal monoolefins—e.g., olefins with 10, 12 and 14 carbon atoms—and 2-butene. The second disproportionation product is removed through line 30 to the second separation zone wherein the higher internal monoolefin fraction within the detergent range, e.g. $C_{12}$ and $C_{14}$, is separated out and recovered through line 42 as product. The 2-butene may be separated in the second separation zone and recycled through line 44 to the first disproportionation zone. Preferably, however, at least a portion of the 2-butene is removed from the second disproportionation zone via line 32 as it is formed.

By use of this integrated process even numbered linear $\alpha$-olefins in a range of carbon numbers, e.g., $C_6$–$C_{12}$ are converted to linear $\beta$-olefins of odd carbon number and linear internal monoolefins of even carbon number within the $C_{11}$ to $C_{14}$ range desired for detergent manufacture

DESCRIPTION OF THE PREFERRED EMBODIMENTS

First disproportionation zone

In the first disproportionation zone I, linear $\alpha$-olefins of substantially even carbon number are converted to linear $\beta$-olefins of substantially odd carbon number by disproportionation with 2-butene in the presence of a catalyst. The disproportionation occurs in a manner such that a linear $\alpha$-olefin of $n$ carbon atoms is converted to a linear $\beta$-olefin of $n+1$ carbon atoms with propylene being formed in equimolar quantities as a by-product. For example, a linear $\alpha$-olefin such as 1-dodecene and 2-butene are disproportionated into 2-tridecene and propylene, the products being present in equimolar quantities. The disproportionation reaction as applied according to the process of the invention—i.e., wherein the $\alpha$-olefin feedstock is a mixture of linear $\alpha$-olefins of substantially even carbon number within a range of carbon numbers—affords a reaction product which is made up substantially of a mixture of linear $\beta$-olefins of odd carbon numbers since each $\alpha$-olefin has increased one carbon atom in chain length through disproportionation and propylene, the propylene being produced in a molar quantity equal to the total moles of $\beta$-olefin formed.

The source of the linear $\alpha$-olefin feed stock to the first disproportionation zone is wholly conventional i.e., the feedstock may originate from any known source or process which provides linear $\alpha$-olefins of substantially even carbon number. For example, suitable sources of $\alpha$-olefins include catalytic oligomerization of ethylene and thermal cracking of wax. Preferred because of their ease of manufacture, abundance in commerce and quality are $\alpha$-olefin feedstocks derived from oligomerization of ethylene. The oligomerization technique and catalysts which may be utilized to prepare the linear $\alpha$-olefin feedstock are wholly conventional being described, for example, in U.S. 2,699,457, issued Jan. 11, 1955 to Ziegler et al., U.S. 3,310,600, issued Mar. 21, 1967, to Ziegler et al. and U.S. 3,478,124, issued Nov. 11, 1969, to Fernald et al., and U.S. 3,482,000, issued Dec. 2, 1969, to Fernald et al. All of the above-mentioned patents are directed to Ziegler-type ethylene oligomerization catalysts i.e., compounds of metals such as alkali metals (e.g., lithium, sodium, potassium), alkaline earth metals such as beryllium and magnesium and Group III metals such as aluminum, gallium and indium. Preferred Ziegler-type oligomerization catalysts are aluminum trialkyls.

Another class of suitable ethylene oligomerization catalysts are nickel complexes of certain phosphorus-containing ligands, including those described in copending application U.S. Ser. No. 874,377, of Keim et al., common assignee, filed Nov. 5, 1969, now abandoned and U.S. Ser. No. 874,058 of Bauer et al., common assignee, filed Nov. 4, 1969, now U.S. Pat. No. 3,647,914. Ser. No. 874,377 discloses the oligomerization of ethylene with nickel chelates of bidentate ligands having a tertiary organophosphorus moiety and a carboxymethyl or carboxyethyl group attached directly to the phosphorus atom of the organophosphorus moiety (e.g., a nickel chelate of diphenylcarboxymethylphosphine). Ser. No. 874,058 discloses the oligomerization of ethylene with nickel chelates of bidentate ligands having a tertiary organophosphorus moiety and a functional group selected from hydroxymethyl, mecaptomethyl, hydrocarboyl and hydrocarbyloxycarbonyl substituted on a carbon atom attached directly to the phosphorus atom of the organophosphorus moiety (e.g. a nickel chelate of diphenylhydroxymethylphosphine).

The product of the oligomerization process typically is a mixture of linear α-olefins of even carbon number in the $C_4$ to $C_{60}$ range. The distribution of the linear α-olefin mixture can be controlled to a certain extent by the choice of oligomerization catalyst and reaction conditions. For most applications, the mixture of linear α-olefins is suitably of from 4 to 40, but preferably of from 4 to 30 carbon atoms per molecule. Oligomerization products having distribution patterns within the preferred range are readily obtainable to those skilled in the art of ethylene oligomerization. Depending on the ultimate range of carbon numbers desired in the linear monolefin product of the invention, the ethylene oligomerization product may be charged directly to the first disproportionation zone or a selected range of ethylene oligomers may be separated from the oligomerization product by conventional techniques prior to introduction to the first disproportionation zone.

The disproportionation reaction can be conducted by any more or less conventional procedure. A description of suitable catalysts and reaction conditions is given in an extensive review article by G. C. Bailey in Catalysis Reviews 3 (1), 37–60 (1969).

One possibility is to utilize a heterogeneous disproportionation catalyst. Catalysts to be recommended are compounds of a metal with atomic number 22 to 25, 40 to 46, 50 and 72 to 77 (hence, the metals titanium, vanadium, chromium, manganese, zirconium, niobium, molybdenum, technitium, ruthenium, rhodium, palladium, tin, hafnium, tantalum, tungsten, rhenium, osmium and iridium). Of said metals, compounds of molybdenum, tungsten, and rhenium are suitable. The above-mentioned disproportionation catalysts may be applied, together with one or more compounds of one or more of the rare-earth metals, among which scandium and yttrium are also included, on a carrier containing at least 75% w. of aluminum oxide.

Most preferred are alumina-supported disproportionation catalysts, containing (1) one or more oxides of molybdenum, of cobalt and one or more alkali metal compounds, or (2) one or more oxides of tungsten and one or more alkali metal compounds, or (3) one or more compounds of rhenium as well as one or more compounds of molybdenum and/or tungsten. The last-mentioned catalysts preferably contain one or more compounds of molybdenum and 2–6% w. of a rhenium compound, calculated as $Re_2O_7$ on the carrier.

Another possibility is to supply the disproportionation catalyst dissolved in the mixture being disproportionated (homogeneous catalyst). Examples of suitable catalysts are those composed by combination of (a) one or more compounds of one or more transition metals of Groups IV–VII and noble metals of Group VIII and (b) one or more organometallic compounds of one or more metals of Groups II and/or III of the Periodic System of Elements, in the additional presence of molecular oxygen and/or a carboxylic acid as a catalyst promoter. Of the latter type of catalysts those containing tungsten hexachloride, ethylaluminum-dichloride and acetic acid have proved to be very suitable.

A side reaction which may occur in the first disproportionation zone I between the molecules of the α-olefins themselves, forming internal olefins and ethylene. Experimental evidence has shown that this side reaction usually takes place to a minor and in many cases to a negligible extent only, the disproportionation between 2-butene and α-olefins in a mixture comprising 2-butene and α-olefins being many times more rapid (for example 12 times) than that between α-olefins themselves. Consequently, the present process has a very attractive feature that little ethylene is formed, which lengthens the life of the catalyst, the life being the time elapsed between two successive catalyst regenerations. There are also side reactions which give rise to the formation of minor quantitives of internal olefins with 10–22 carbon atoms (the olefins with 10 and 22 carbon atoms, for example, from 1-hexene and 1-dodecene, respectively). The olefins with 12 and 14 carbon atoms are within the detergent range and the olefins with 10, 16, 18, 20 and 22 carbon atoms may, after separation from the reaction mixture formed in step 1, be recycled to step 1 for disproportionation with 2-butene to form β-olefins which are partly within and partly below the selected range.

One of the desirable features of the present process is the formation of propylene as a by-product of the reaction in the disproportionation zone I. This propylene may be used as a starting material for the manufacture of a great variety of important commercial products. However, because the reaction mixture in the first disproportionation zone is an equilibrium mixture of reactants and reaction products the conversion to the desired linear β-olefins can be promoted by keeping the reaction mixture poor in propylene. This can easily be effected by making use of the high volatility of propylene. The mixture may be kept poor in propylene by separating the reaction mixture from the catalyst, feeding the separated mixtures from proplyene e.g., by stripping with an inert gas such as nitrogen or carbon dioxide, but preferably with 2-butene, and then partly returning the mixture to the reaction zone. Keeping the mixture being disproportionated poor in propylene has a favorable result that this mixture is simultaneously kept poor in ethylene (formed by the above-described side reaction between α-olefins), which lengthens the life of the first disproportionation catalyst. Ethylene and propylene may also be removed from said mixture by means of distillation. The use of any one of the above described techniques or any other technique which is conventional to those skilled in the art to keep the reaction mixture in the first disproportionation zone poor in propylene forms another preferred embodiment of this invention.

According to the process of the invention, the reaction in the first disproportionation zone may be effected batchwise or continuous, in the gas phase but preferably in the liquid phase, with fixed catalyst beds, suspended catalyst, fluidized catalyst beds, in a reactor provided with a stirring device or with application of another conventional contacting technique. Generally, this reaction is conducted at pressures greater than atmospheric e.g., 5 to 50 atmospheres.

As indicated above, little ethylene is formed in the first disproportionation zone. Formation of ethylene may be further suppressed by taking various measures, for example by keeping the mixture being disproportionated in zone 1 relatively rich in 2-butene. This can be achieved by effecting this disproportionation in a one-stage reactor, or in a reactor system approaching a one-stage operation, for example in a reactor provided with a stirring device, or in a fixed catalyst bed with application of recycle of reaction mixture stripped of ethylene and propylene. It has been found that the rate of conversion of the α-olefins does not depend on the concentration of the α-olefins up to about 70% conversion. Consequently, reaction mixtures having a low, for example 30% w., α-olefins concentration can be used. The side reaction in the first disproportionation zone between themselves is also suppressed by applying a high molar ratio between 2-butene and the total reaction mixture, for example a value between 0.4 and 10, particularly between 0.6 and 3. Said side reaction is further suppressed by effecting the disproportionation in zone I in the presence of a diluent, for example an alkane, such as n-decane. Application of one or more of the above-mentioned measures results in a surprising long catalyst life and in hardly any formation of high molecular weight compounds.

First Separation zone

The linear β-olefin reaction mixture from the first disproportionation zone is passed to the first separation zone II. The separation zone II may comprise a suitable fractionation unit or similar conventional separation apparatus. The β-olefins are separated into a lower β-olefin fraction of odd carbon number and a higher β-olefin fraction of odd carbon number within the selected range e.g., $C_{11}$ to $C_{15}$. The range of odd carbon numbers of the higher β-olefin fraction can be any range desired. Useful ranges are from about 2 carbon-numbers to 10 carbon-numbers e.g. $C_{11}$–$C_{13}$, $C_{15}$–$C_{17}$, $C_{11}$–$C_{17}$ $C_{11}$–$C_{21}$, $C_{11}$–$C_{15}$ and the like. The lower β-olefin fraction may include unreacted 2-butene up to the β-olefin fraction but preferably contains only α-olefins of carbon-numbers lower than the carbon number of the lowest β-olefin in the intermediate β-olefin fracton. Optionally, any unreacted 2-butene may be recycled to the first disproportionation zone. Also, in an alternative embodiment of this invention wherein at least a portion of the propylene by-product of the first disproportionation zone I is carried into the first separation zone II, the propene may be separated and recovered for use in other applications in the first separation zone II.

The reaction product from the first disproportionation zone II may contain, in addition to the desired β-olefins of odd carbon number, unreacted α-olefins and internal olefin products of the reaction between the same or different α-olefins. In certain preferred modifications of the instant invention these α-olefins and internal monoolefins are handled in the first separation zone II according to the following procedures. The unreacted α-olefins lying below the range of the lowest β-olefin formed (the α-olefin having $C_n$ carbon atoms and the lowest β-olefin having $C_{n+1}$ carbon atoms) may be preferably recycled to the first disporportionation zone or alternatively allowed to pass out to the second disproportionation zone III (see below) where they will react substantially with β-olefins below the selected range to form internal monoolefins partly below and partly within the selected range and propylene. Any unreacted α-olefins having carbon numbers within the lower β-monoolefin range are preferably separated and recovered with the lower β-olefin fraction since they will react in the second disproportionation zone III (see below) with the lower β-olefins to form internal monoolefins which are substantially within the selected range and propylene. Any unreacted α-olefins and internal olefins of carbon number such that they fall between the highest carbon number of the lower β-olefin fraction and the lowest carbon number of the higher β-olefin fraction e.g., $C_{10}$ internal and β-olefins falling between $C_9$ and $C_{11}$ β-olefins, are preferably recovered and recycled to the first disproportionation zone where they will form β-olefins which are within and below the selected range, respectively. Those unreacted α-olefins and internal olefins within the selected range of carbon numbers are preferably recovered as product with the higher β-olefin fraction within the selected range. The fraction containing higher internal monoolefins above the selected range of carbon numbers is preferably recovered and recycled to the first disproportionation zone for reaction with 2-butene to form β-olefins within the selected range.

Second disproportionation zone

In the second disproportionation zone III the mixture of β-olefins isolated as the lower β-olefin fraction in the first separation II are subject to mutual disproportionation in the presence of a second disproportionation catalyst. The reaction product of the second disproportionation zone is a mixture of 2-butene and even numbered internal monoolefins whose carbon numbers fall substantially within the selected range of carbon numbers. This reaction product may be characterized as a mixture of internal monoolefins having $2n-2$ carbon atoms (the reaction product of mutual disproportionation between two molecules of a β-olefin of $n+1$ carbon atoms), internal monoolefins having $n_1+n_2-2$ carbon atoms (the reaction product of two dissimilar β-monoolefins of $n_1+1$ and $n_2+1$ carbon atoms) and 2-butene, the 2-butene being formed in equimolar quantities to the total moles of internal monoolefins formed. For example mutual disproportionation of a mixture of β-olefins of 7 and 9 carbon atoms will yield internal monoolefins of 12, 14 and 16 carbon atoms and 2-butene.

The catalyst and reaction conditions utilized in the second disproportionation zone III may be the same or different from the specific catalyst and conditions used in the first disproportionation zone I. However, in general the catalyst of zone III will be selected from the same class of catalysts described for zone I above, and preferably is the same specific catalyst as is utilized in zone I.

Another attractive feature of the instant invention is the formation of 2-butene in the second disproportionation zone III since the 2-butene formed can be recycled to the first disproportionation zone thus providing a ready, economical source of 2-butene while at the same time increasing the overall conversion of 2-butene to the desired β- and internal monoolefins in the process. However, as in the first disproportionation zone, the reaction product in the second disproportionation zone exists as an equilibrium mixture of reactants and reaction products, thus the conversion to the desired internal monoolefins is enhanced by keeping the reaction mixture poor in 2-butene. This can be accomplished by conventional techniques such as separating the reaction mixture from the catalyst, freeing the separated mixture from 2-butene e.g., by heating the mixture to a temperature at which it boils, and then partly returning the mixture to zone III. The use of this or any other technique which is conventional to those skilled in the art to keep the reaction mixture in zone III poor in 2-butene forms another preferred embodiment of the instant invention.

Second separation zone

The even numbered internal monoolefins within the selected range of carbon numbers are separated as product in the second separation zone IV. As with the first separation zone II, the second separation zone IV may comprise a suitable fractionation unit or similar conventional separation. In an alternative embodiment of the instant invention wherein at least a portion of the 2-butene formed in the second disproportionation zone III is carried into the product stream, the 2-butene may be separated and recycled to the first disproportionation zone I in the second separation zone IV.

Depending on the range of carbon numbers desired, the second disproportionation reaction may form minor quantities of internal monoolefins which are above and/or below the desired range of carbon numbers. In a preferred modification of the process of this invention, these internal monoolefins having carbon numbers above and/or below the desired range may be separated in the second separation zone IV and recycled to the first disproportionation zone I.

Illustrative Embodiment I

A mixture containing linear monoolefins with 11, 12, 13 and 14 carbon atoms, the selected range being 11–14, was prepared. For this purpose a mixture consisting of 42.7% m. 1-hexene, 27.8% m. 1-octene, 18.0% m. 1-decene and 11.5% m. 1-dodecene was used as a starting material for reaction in zone I. This mixture had been purified by stripping with nitrogen and drying by means of molecular sieves. The first and the second disproportionation catalyst consisted of gamma-alumina with a specific surface area of 272 m.²/g. and a pore volume of 0.44 ml./g. supporting oxides of cobalt, of molybdenum and of potassium in quantities of 3.2% w., 8.3% w. and 0.5% w., respectively, calculated as metal on carrier. The catalyst further contained 1.5% w. sulphate and 1.1% w. silica, calculated as $SO_4$ and $SiO_2$, respectively, on carrier. The supported catalysts were activated by heating in air for 4 hours at 590° C., followed by cooling in a nitrogen atmosphere. The catalyst consisted of 3 mm. extrudates.

The starting material together with 2-butene was conducted at a liquid hourly space velocity of 2 litres starting material/kg. catalyst/hour and at a pressure of 14 atmospheres through a fixed bed containing the catalyst.

This procedure was continued for 400 hours during which the temperature of the bed was gradually raised from 120° C. at the beginning to 140° C. at the end of this period. The liquid withdrawn from the fixed bed was introduced into a vessel in which it was freed from propylene and ethylene by stripping with 2-butene. Then it was partly returned to the fixed bed and partly withdrawn for use in zone II. The weight ratio between the liquid returned to the fixed bed and the starting material was 5. The stripping with 2-butene was effected at 20° C., which kept the molar ratio between starting material plus returned liquid and 2-butene introduced into the fixed bed at about 1.

The composition of the mixture withdrawn after 400 hours' operation for use in zone II was as follows (percent m.): 13.7 $C_6$, 24.9 $C_7$, 9.1 $C_8$, 15.3 $C_9$, 8.6 $C_{10}$, 9.35 $C_{11}$, 7.1 $C_{12}$, 5.8 $C_{13}$, 2.7 $C_{14}$, 0.03 $C_{15}$, 2.2 $C_{16}$, 0 $C_{17}$, 0.9 $C_{18}$, 0 $C_{19}$, 0.3 $C_{20}$, 0 $C_2$ and 0.01 $C_{22}$. This mixture was distilled (zone II) to separate three fractions, via a mixture of $C_{11}$, $C_{12}$, $C_{13}$, and $C_{14}$ olefins, 1-octene and 2-nonene. 1-octene and 2-nonene were recombined to form a mixture consisting of 30% w. 1-octene and 70% w. 2-nonene. The 1-octene/2-nonene mixture was conducted at a liquid hourly space velocity of 2 liters mixtures/kg. catalyst/hour at a pressure of 20 bar abs. through a fixed bed of a catalyst with the composition described above (zone III). The temperature of the catalyst bed was kept at 120° C. This procedure was performed for 60 hours. The liquid withdrawn from the catalyst bed was introduced into a vessel where it was heated at atmospheric pressure to its initial boiling point (about 150° C.) to remove 2-butene. The liquid withdrawn from the vessel was partly recycled to the catalyst bed and the balance recovered as product. The weight ratio between the liquid recycled and the 1-octene/2-nonene mixture introduced into the bed was 15. The average composition of the mixture recovered as product after 5 hours' operation was as follows (percent m.): 2.9 $C_8$; 22.4 $C_9$; 0.5 $C_{10}$; 0.2 $C_{11}$; 0.3 $C_{12}$; 3.2 $C_{13}$; 69.6 $C_{14}$ and 0.9 $C_{15}$. This mixture was distilled (zone IV) to form a mixture consisting of $C_1$, $C_{12}$, $C_{13}$ and $C_{14}$ olefins.

Illustrative Embodiment II 340 ml. 1-octene purified by stripping with nitrogen and dried by means of molecular sieves was used as a starting material. The catalyst had the same composition as that used in Illustrative Embodiment I and was applied as a powder in a quantity of 60 grams. It was activated by heating for 4 hours in a nitrogen atmosphere at 540° C.

The 1-octene and the catalyst were introduced into a vessel (zone I) provided with a stirrer making 1000 revolutions per minute. Then, 2-butene was passed at atmospheric pressure through the suspension in the vessel at a rate of 48 Nl. per hour. The temperature of the suspension was kept at 80° C. Some results are presented in Table I.

TABLE I

| Olefin | Composition reaction mixture, percent wt, after (hours)— | | | | | |
|---|---|---|---|---|---|---|
|  | 0.5 | 1 | 1.5 | 2 | 3 | 4 |
| $C_8$ | 94.0 | 85.5 | 76.5 | 64.8 | 38.9 | 22.9 |
| $C_9$ | 1.9 | 4.6 | 7.7 | 11.3 | 19.0 | 23.7 |
| $1_{10}$ | 0.07 | 0.42 | 0.41 | 0.30 | 0.45 | 0.64 |
| $C_{11}$ | 0.04 | 0.35 | 0.33 | 0.19 | 0.34 | 0.41 |
| $C_{12}$ | 0.11 | 0.31 | 0.36 | 0.38 | 0.77 | 1.0 |
| $C_{13}$ | 0.46 | 1.1 | 1.8 | 2.9 | 6.0 | 8.4 |
| $C_{14}$ | 2.7 | 7.2 | 12.1 | 19.4 | 33.7 | 41.7 |
| $C_{15}$ | 0.62 | 0.24 | 0.61 | 0.69 | 0.78 | 0.97 |
| $>C_{15}$ | 0.05 | 0.08 | 0.06 | 0.08 | 0.09 | 0.11 |
| $C_8$ converted, percent | 6 | 14.5 | 23.5 | 35.2 | 6.19 | 77.1 |
| $C_{14}/C_9$ molar ratio | 0.94 | 1.02 | 1.01 | 1.11 | 1.14 | 1.14 |
| $C_3/C_2$ molar ratio in gas withdrawn from the vessel | 1.31 | 1.57 |  | 2.31 |  | 7.15 |

The olefin fractions containing 8 and 9 carbon atoms (fractions $C_8$ and $C_9$ in Table I above) are then converted to detergent range product according to the general procedure described in Illustrative Embodiment I i.e., the fractions are separated in zone II, disproportionated in zone III thereby producing an internal monoolefin of 14 carbon atoms within the detergent range and the detergent range reaction product of zone III is isolated as product in zone IV. The fractions within the detergent range, e.g., $C_{11}$ to $C_{14}$, formed in the reaction zone I are separated as product in zone II.

Illustrative Embodiment III

The experiment described in Illustrative Embodiment II was repeated under the same conditions, but using 170 ml. 1-octene diluted with 170 ml. n-decane as a starting material. Some results are presented in Table II.

TABLE II

| Olefin | Composition reaction mixture, percent wt, after (hours)— | | | | | |
|---|---|---|---|---|---|---|
|  | 0.5 | 1 | 1.5 | 2 | 3 | 4 |
| $C_8$ | 88.6 | 73.6 | 55.6 | 36.6 | 11.7 | 7.5 |
| $C_9$ | 5.0 | 12.3 | 20.5 | 28.3 | 40.9 | 44.0 |
| $C_{13}$ | 0.97 | 2.4 | 4.0 | 6.0 | 8.5 | 9.2 |
| $C_{14}$ | 4.1 | 9.8 | 17.3 | 25.8 | 36.6 | 36.8 |
| $C_8$ converted, percent | 11.4 | 26.4 | 44.4 | 63.4 | 88.3 | 92.5 |
| $C_{14}/C_9$ molar ratio | 0.52 | 0.51 | 0.54 | 0.58 | 0.57 | 0.54 |
| $C_3/C_2$ molar ratio in gas withdrawn from the vessel | 2.87 | 3.65 |  | 8.1 |  |  |

The β-olefin fractions containing 8 and 9 carbon atoms (fractions $C_8$ and $C_9$ in Table II above) are then converted to detergent range product according to the general procedure described in Illustrative Embodiment I, i.e., the fractions are separated in zone II, disproportionated in zone III thereby producing an internal monoolefin of 14 carbon atoms within the detergent range and the detergent range reaction product of zone III is isolated as product in zone IV. The fractions within the detergent range, e.g., $C_{11}$ to $C_{14}$, formed in the reaction zone I are separated as product in zone II.

Illustrative Embodiment IV

The experiment described in Illustrative Embodiment II was repeated under the same conditions, but at a pressure of 6.2 atmospheres which results in an initial molar ratio 2-butene/1-octene in the mixture of 1.5. Some results are presented in Table III.

TABLE III

| Olefin | Composition reaction mixture, percent wt, after (hours)— | | | |
|---|---|---|---|---|
|  | 1 | 2 | 3 | 4 |
| $C_8$ | 78.6 | 51.8 | 26.2 | 15.4 |
| $C_9$ | 16.6 | 38.7 | 60.2 | 70.0 |
| $C_{13}$ | 0.2 | 0.5 | 0.9 | 0.9 |
| $C_{14}$ | 4.6 | 9.1 | 12.6 | 13.8 |
| $C_8$ converted, percent | 21.4 | 48.2 | 73.8 | 84.6 |
| $C_{14}/C_9$ molar ratio | 0.18 | 0.15 | 0.13 | 0.13 |
| $C_3/C_2$ molar ratio in gas withdrawn from the vessel | 15.7 |  |  |  |

The olefin fractions containing 8 and 9 carbon atoms (fractions $C_8$ and $C_9$ in Table III above) are then converted to detergent range product according to the general procedure described in Illustrative Embodiment I, i.e., the fractions are separated in zone II, disproportionated in zone III whereby producing an internal monoolefin of 14 carbon atoms within the detergent range and the detergent range reaction product of zone III is isolated as product in zone IV. The fractions within the detergent range e.g., $C_{11}$ to $C_{14}$, formed in the reaction zone I are separated as product in zone II.

Illustrative Embodiment V

A solution of 127 mmol (19.9 ml.) 1-octene in 20 ml. chlorobenzene was saturated with cis-2-butene (gain in weight 10 g.) at 20° C. and atmospheric pressure. Then, the catalyst was added, a mixture of 0.0128 mmole $WCl_6$, 0.0512 mmol ethylaluminum dichloride and 0.0064 mmole acetic acid, the molar ratio between 1-octene and $WCl_6$ being about 10,000. During the disproportionation 2-butene was bubbled through the reaction mixture at a gas rate of 2 l./h.

The composition of the reaction mixture determined after various reaction times, is presented in Table IV.

TABLE IV

| | Composition of reaction mixture, percent wt. | | | | |
|---|---|---|---|---|---|
| | $C_8$ | $C_9$ | $C_{11}$ | $C_{13}$ | $C_{14}$ | $>C_{14}$ |
| Reaction time min.: | | | | | | |
| 5 | 92.7 | 7.1 | | | 0.2 | |
| 15 | 91.3 | 8.6 | | | 0.2 | |
| 50 | 90.2 | 9.58 | | | 0.2 | |
| 95 | 88.5 | 10.8 | | | 0.2 | 0.2 |
| 270 | 86.0 | 12.7 | | | 0.2 | 0.9 |
| 1,260 | 82.5 | 16.3 | | | 0.3 | 0.9 |
| After addition of a second equal amount of catalyst: | | | | | | |
| 25 | 77.5 | 21.3 | | | 0.4 | 0.9 |
| 105 | 74.0 | 24.4 | | | 0.5 | 1.0 |
| After addition of a third equal amount of catalyst: | | | | | | |
| 5 | 65.8 | 28.8 | | 0.21 | 1.92 | 3.4 |
| 1,020 | 54.5 | 30.6 | 0.98 | 1.47 | 6.37 | 4.65 |

The results presented show that the disproportionation is very selective to the formation of 2-nonene, internal tetradecene being formed in only small quantities.

The 2-nonene reaction product and the remaining 1-octene reactant are then converted to detergent range internal monoolefin by the general procedure described in Illustrative Embodiment I, i.e., the 2-nonene and 1-octene are separated in zone III and disproportionated in zone III thereby producing an internal olefin of 14 carbon atoms which is subsequently isolated as detergent range product in zone IV.

We claim as our invention:

1. A process of converting linear α-olefins of even carbon number to linear monoolefins of both even and odd carbon number within a detergent range of carbon numbers by (1) disproportionating in a first reaction zone in the presence of an olefin disproportionation catalyst, linear α-olefins of even carbon number in the $C_6$–$C_{12}$ range with 2-butene, thereby producing linear β-olefins and propylene;

(2) separating the resulting disproportionation product in a first separation zone into a lower linear β-olefin fraction below the detergent range of carbon numbers;

(3) recovering the higher linear β-olefin fraction as product;

(4) subjecting the lower β-olefin fratcion to disproportionation in a second reaction zone, thereby producing 2-butene and linear internal monoolefins;

(5) separating in a second separation zone and recovering from the second disproportionation product mixture the normal internal monoolefin fraction within the detergent range of carbon numbers.

2. The process of claim 1 wherein the 2-butene formed in the second reaction zone is recovered and recycled to the first reaction zone.

3. The process of claim 2 wherein the reaction products of the first and second reaction zones are kept poor in propene and 2-butene, respectively.

4. The process of claim 3 wherein the linear α-olefin charge to the first reaction zone is a mixture of α-olefins derived from the oligomerization ethylene.

References Cited
UNITED STATES PATENTS

| | | | |
|---|---|---|---|
| 3,590,095 | 6/1971 | Zuech | 260—683 |
| 3,491,163 | 1/1970 | Kenton et al. | 260—683 |
| 3,600,456 | 8/1971 | Bradshaw | 260—683 |
| 3,296,330 | 1/1967 | Sherk | 260—683 |
| 3,647,906 | 3/1972 | Farley | 260—682 |
| 3,485,891 | 12/1969 | Heckelsberg | 260—683 |

DELBERT E. GANTZ, Primary Examiner

C. E. SPRESSER, Jr., Assistant Examiner